United States Patent

Hall, III

[11] Patent Number: 5,263,320
[45] Date of Patent: Nov. 23, 1993

[54] CONVERTER BYPASS PISTON FOR REDUCED IDLE LOSS

[75] Inventor: Arthur Hall, III, Cicero, Ind.

[73] Assignee: General Motors Corporation, Detroit, Mich.

[21] Appl. No.: 851,713

[22] Filed: Mar. 16, 1992

[51] Int. Cl.⁵ .................................. F16D 33/06
[52] U.S. Cl. .............................. 60/360; 60/357; 60/347
[58] Field of Search .............. 60/341, 347, 352, 353, 60/330, 357, 359, 360

[56] References Cited

U.S. PATENT DOCUMENTS

| | | | |
|---|---|---|---|
| 2,141,305 | 12/1938 | Kosters | 60/360 |
| 2,432,191 | 12/1947 | Chilton | 60/360 |
| 3,232,138 | 2/1966 | Burckhardt | 60/360 |
| 3,533,235 | 10/1970 | Oguma et al. | 60/357 |
| 3,673,700 | 7/1972 | Audiffred et al. | 60/360 X |
| 4,073,139 | 2/1978 | Armasow et al. | 60/357 |
| 4,175,647 | 11/1979 | Hanke | 60/357 X |
| 4,201,050 | 5/1980 | Nixel | 60/359 X |
| 4,311,068 | 1/1982 | Chatterjea | 74/733 |
| 4,344,499 | 8/1982 | van der Lely et al. | 180/197 |
| 4,458,792 | 7/1984 | Thomas et al. | 60/360 X |

FOREIGN PATENT DOCUMENTS

| | | | |
|---|---|---|---|
| 571347 | 2/1933 | Fed. Rep. of Germany | 60/359 |
| 1011230 | 6/1957 | Fed. Rep. of Germany | 60/359 |

OTHER PUBLICATIONS

Complete Car Car Manual, Reader Digest, 1981, pp. 92-93.

Primary Examiner—Edward K. Look
Assistant Examiner—Hoang Nguyen
Attorney, Agent, or Firm—Kevin M. Hinman

[57] ABSTRACT

An axially oriented annular piston is provided in the torque converter. It encircles the converter pump. The piston has an open and a closed position. In the open position, a portion of the fluid exiting the converter pump bypasses the turbine, passing through an axial gap between the pump and the turbine. Having some of the fluid bypass the turbine reduces the amount of fluid impinging on the turbine, thereby reducing the torque induced in the turbine by the fluid. When the piston is in the closed position, all of the fluid is directed toward the turbine, maximizing the torque developed. Springs keep the piston in the open position at rotative speeds at or below an engine idle speed. As the rotative speed of the pump is increased beyond engine idle, a centrifugal chamber opposed to the springs fills with fluid and forces the piston to the closed position.

2 Claims, 2 Drawing Sheets

CONVERTER BYPASS PISTON FOR REDUCED IDLE LOSS

TECHNICAL FIELD

This invention relates to fluid torque converters for use in vehicles with automatic transmissions. More specifically, this invention relates to altering the flow of fluid within a torque converter to minimize torque transmitted at idle.

BACKGROUND OF THE INVENTION

In fluid torque converters interposed between an engine and an automatic transmission, a fluid pump is rotatively connected to an engine and a turbine is rotatively connected to an output member. The output member is rotatively connected to driving wheels through the transmission. Pump blades direct transmission fluid against turbine blades such that torque is imparted to the turbine. The fluid passes from the turbine to a stator which redirects the momentum of the fluid back toward the pump. Fluid moving within the torque converter tends to increase in temperature from where it enters the turbine to where it leaves the turbine, particularly when the pump is rotating at a greater speed than the turbine. A portion of the hot fluid exiting the turbine is diverted from the stator for delivery to a cooler. Fluid from the cooler is returned to the converter at the pump inlet. The magnitude of torque transmitted is sufficient to propel the vehicle when the transmission is in gear and the vehicle brake is released.

A condition known as "Gear Engaged Idle" is encountered when the engine is running, the transmission is in gear, and the vehicle is stopped. Typically the vehicle brake is applied to prevent the vehicle from creeping forward. The torque converter turbine is stalled, that is, held motionless, by rotatively locked vehicle wheels. Engine torque must overcome the drag created by the stalled turbine to rotate the pump. This drag torque increases approximately linearly with the speed of the pump. The precise relationship between engine speed and resultant drag torque is a function of the design of the blades of the turbine and the pump. The engine power required to rotate the pump equals the required engine torque multiplied by the engine speed, and therefore increases at near the square of the increase in engine speed. No power is transmitted through the turbine because the turbine is prevented from rotating. The energy expended by the engine is instead largely absorbed by the fluid in the form of heat. This heat absorption significantly increases the cooling needs of the transmission when the idle speed is increased.

Elevated idle speeds are a particular concern with military vehicles. There exists a condition known as "tactical idle" where the vehicle operator selectively boosts idle speed to 50% higher than the normal idle speed. This provides improved vehicle acceleration from a standing stop for combat conditions. The heat absorbed by the fluid may increase by more than 100% with a 50% increase in idle speed. A proportionate increase in cooling capacity would be required. Increasing cooling capacity generally results in an increase in vehicle mass with either the addition of extra heat exchange area, or the addition of engine driven transmission fluid circulating pumps. This extra cooling capacity and its associated weight penalty are only required for the "tactical idle" operating mode.

SUMMARY OF THE INVENTION

This invention reduces the need for extra cooling capacity for the "tactical idle" operating mode by reducing the quantity of fluid impinging on the turbine blades. This is done by providing a turbine bypass piston which selectively opens and closes a radial path between the pump and the turbine. When closed, fluid leaving the pump blades is principally directed toward the turbine blades. When open, a portion of the fluid leaving the pump blades is able to bypass the turbine blades by escaping radially outward and traveling around the outside of the turbine.

The concept of having fluid bypass the turbine to reduce torque is known in the art. Prior art devices divert fluid from the turbine to reduce torque due to a sudden increase in engine speed relative to the speed of the turbine. The present invention, however, diverts fluid away from the turbine selectively, doing so only at low pump speeds and employing a piston to selectively change the flow.

The fluid is diverted from the turbine by configuring the pump and turbine so as to facilitate the diversion of a portion of the fluid exiting the pump away from the turbine. The piston has both an open position and a closed position. The piston rotates with the pump. Springs tend to keep the piston in the open position, allowing fluid to escape past the turbine. A centrifugal chamber is disposed opposite the springs relative to the piston. The chamber fills with fluid which is subjected to radial acceleration increasing with the rotative speed of the pump. Fluid pressure against the piston increases with the radial acceleration, overcoming the spring force to begin displacing the piston at idle. The springs are selected so that the rotation induced pressure begins to compress the springs near the idle speed.

When engine speed is below or equal to idle, the spring force prevails over the fluid pressure inside the centrifugal chamber. This once again allows fluid from the pump to pass through the gap between the pump outlet and the turbine inlet, escaping the turbine, and reducing the resultant torque against the turbine.

It is an object of this invention to reduce fuel consumption at idle.

It is also an object of this invention to reduce the magnitude of engine torque required to maintain an engine at an idle speed.

It is further an object of this invention to reduce the required fluid cooling capacity for a torque converter.

It is yet a further object of this invention reduce vehicle creep when the engine is idling, the transmission is in gear, and the brake is released.

It still another object of this invention to provide a bypass mechanism disposed within a torque converter, functionally interposed between an engine and a transmission, the bypass mechanism including a means for diverting a portion of fluid exiting a converter pump away from a converter turbine, and means for selectively directing the portion of the fluid diverted away from the turbine back toward the turbine as a rotative speed of the pump rises beyond a predetermined rotative speed.

It is an even further object of this invention to provide a bypass mechanism disposed within a torque converter functionally interposed between an engine and a transmission, the bypass mechanism including a pump and a turbine configured so as to provide an axial gap between the pump and the turbine through which a portion of the fluid leaving the pump can travel radially beyond the turbine, a converter housing and a pump shell cooperating to provide an annular piston chamber for an annular piston, the piston dividing the chamber into a spring chamber and a centrifugal chamber, the piston selectively translating between an open and a closed position, the piston closing the gap in the closed position, a fluid feed channel connecting a blade side of a pump shell with the centrifugal chamber and with a spring tending to keep the piston in the open position, a vent means connecting the spring chamber with a transmission housing interior outside of the converter housing, and the piston moving from the open position to the closed position as the pump speed increases beyond an engine idle speed.

These and other objects and advantages will be more apparent from the following description and drawings.

DESCRIPTION OF THE PREFERRED EMBODIMENT

Figure 1:
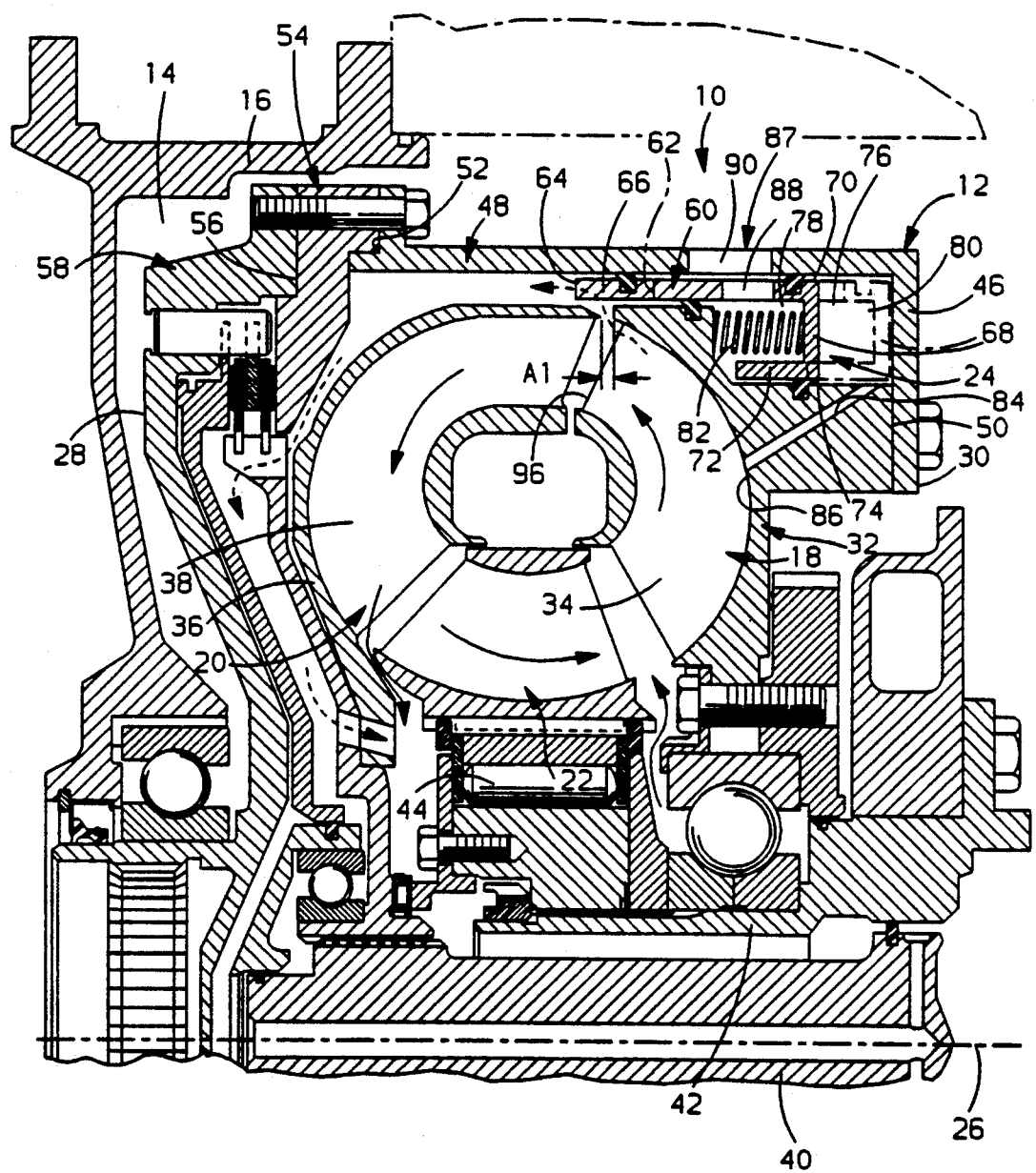
FIG. 1 shows a sectional side view of a torque converter having a bypass mechanism with the pump and turbine blades configured to illustrate a first design facilitating the fluid bypassing the turbine.
Figure 2:
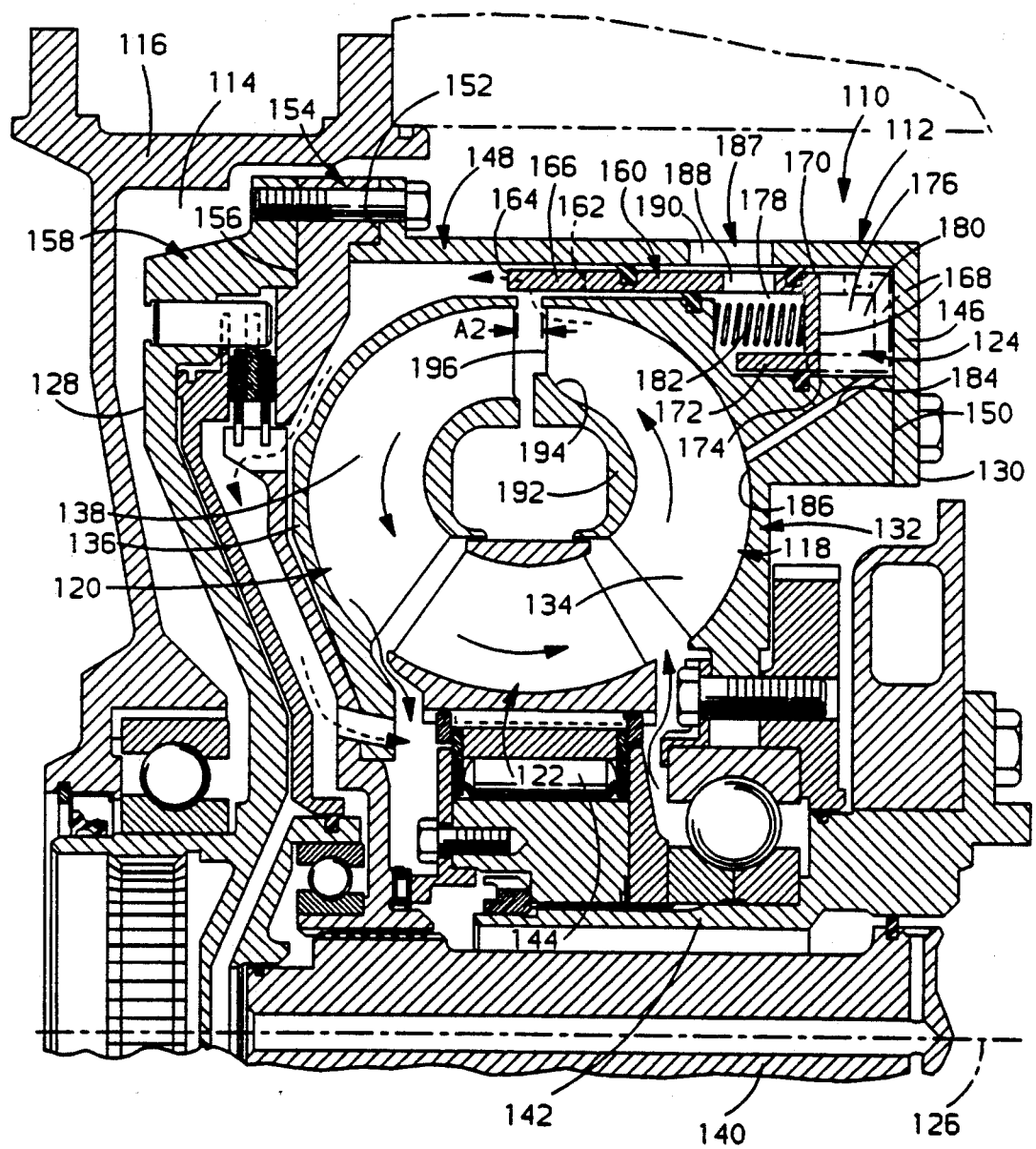
FIG. 2 shows a sectional side view of a torque converter having a bypass mechanism with the pump and turbine blades configured to illustrate a second design facilitating the fluid bypassing the turbine.

Torque converters 10, 110 of the type shown in FIG. 1 and FIG. 2 are known as "wet" converters where a converter housing 12, 112 is entirely disposed within an interior 14, 114 of a transmission housing 16, 116. The converter housing 12, 112 encloses a pump 18, 118, a turbine 20, 120, a stator 22, 122, and a bypass mechanism 24, 124, all disposed around a central axis of rotation 26, 126. The torque converter 10, 110 is axially disposed between an engine (not shown) and a transmission (not shown). A front end 28, 128 of the converter is proximate to the engine and a rear end 30, 130 of the converter 10, 110 is proximate to the transmission.

The pump 18, 118 includes a pump shell 32, 132 and pump blades 34, 134. The pump 18, 118 is rotatively fixed to the engine. The turbine 20, 120 includes a turbine shell 36, 136 and turbine blades 38, 138. The turbine 20, 120 is rotatively fixed to a converter output member 40, 140. The stator 22, 122 is disposed between the turbine 20, 120 and the pump 18, 118 and is attached to a fixed shaft 42, 142 through a one way clutch 44, 144.

The converter housing 12, 112 is formed by bolting together a number of axially oriented parts. A rear end 46, 146 of a pump cover 48, 148 is fixed to a rear end 50, 150 of the pump shell 32, 132 the pump cover 48, 148 projecting forward and enclosing the pump shell 32, 132. The pump cover 48, 148 is fixed on a front end 52, 152 to an adapter plate 54, 154. The adapter plate 54, 154 is in turn fixed on a front end 56, 156 to a front cover 58, 158. The front cover 58, 158 is at the front end 28, 128 of the converter 10, 110 and is rotatively fixed to the engine.

The bypass mechanism 24, 124 provides means for selectively directing fluid exiting the pump 18, 118 toward the turbine 20, 120. A principal component of the bypass mechanism 24, 124 is an annular piston 60, 160. The piston 60, 160 translates axially in forward and rearward directions between corresponding open 62, 162 and closed 64, 164 positions. The annular piston 60, 160 has a sleeve portion 66, 166 and a ring portion 68, 168. The sleeve portion 66, 166 encircles the pump 18, 118 and the turbine 20, 120 in the closed position 64, 164, blocking an axial gap A1, A2 between the pump shell 32, 132 and the turbine shell 36, 136. In the open position 62, 162, the sleeve portion 66, 166 does not impinge on the gap A1, A2.

The sleeve portion 66, 166 projects forward from the ring portion 68, 168 at an outer circumference 70, 170 of the ring portion. A lip 72, 172 projects forward from an inner circumference 74, 174 of the ring portion 68, 168.

The ring portion 68, 168 and the piston lip 72, 172 are entirely disposed within an annular piston chamber 76, 176 formed between the pump cover 48, 148 and the pump shell 32, 132. The piston chamber 76, 176 is in turn divided into two chambers by the ring portion 68, 168. A spring chamber 78, 178 is forward of the ring portion 68, 168 and a centrifugal chamber 80, 180 is rearward of the ring portion 68, 168. Axially oriented compression springs 82, 182 are located in the spring chamber 78, 178 between the ring portion 68, 168 of the piston 60, 160 and the pump shell 32, 132. The springs 82, 182 tend to displace the piston 60, 160 to the open position 62, 162. A fluid feed channel 84, 184 passes through the pump shell 32, 132, fluidly connecting a blade side 86, 186 of the pump shell 34, 134 with the centrifugal chamber 80, 180.

A vent means 87, 187 is provided between the spring chamber 78, 178 and the transmission housing interior 14, 114 by fluidly connected apertures 88, 188 and 90, 190. The aperture 88, 188 passing through the piston sleeve portion 66, 166 is approximately perpendicular to the axis 26, 126, and fluidly connects the spring chamber 78, 178 with the pump cover 48, 148. The aperture 90, 190 passing through the pump cover 48, 148 fluidly connects the aperture 88, 188 in the sleeve portion 66, 166 with the transmission housing interior 14, 114.

The sleeve portion 66, 166 of the piston is slidably sealed with both the converter housing 12, 112 and with the pump shell 32, 132, forward and rearward of both the aperture 88, 188 in the sleeve portion 66, 166 and the aperture 90, 190 in the pump cover 48, 148. The sleeve portion 66, 166 is also slidably sealed with the pump shell 32, 132 forward of the aperture 88, 188 through the piston sleeve 66, 166. The lip 72, 172 is slidably sealed with the pump shell 32, 132.

The pump 18, 118 and turbine 20, 120 provide a means for diverting an optimal amount of fluid exiting the pump 18, 118 away from the turbine 20, 120 with the piston 60, 160 in the open position 62, 162.

FIG. 1 shows one configuration of the pump 18, turbine 20, and stator 22 combination. The pump blades 34 have been reduced in length and the turbine blades 38 have been increased in length. There is an axial gap A1 between an exit side 96 of the pump 18 and the turbine 20.

FIG. 2 shows an alternative configuration of the pump 118, turbine 120, and stator 122 combination with a pump core 192 having a radially outward directed ramp 194 at a pump exit side 196. There is an axial gap A2 between the exit side 196 of the pump 118 and the turbine 120.

The following description of the operation of this invention makes its advantages more apparent.

In a gear engaged idle condition, the engine, and therefore the converter housing 12, 112, and pump 18, 118 rotate at a predetermined rotative speed, hereinafter referred to as idle, and the converter output member 40, 140 is fixed to ground. Fluid is thrown from the exit side 96, 196 of the pump 18, 118 toward the turbine 20, 120. Fluid entering the turbine 20, 120 strikes the turbine blades 38, 138, inducing a torsional reaction. The turbine 20, 120 does not rotate, since it is rotatively fixed to the output member 40, 140. The torque produced by the engine at least equals the torque induced in the turbine 20, 120. The energy produced by the engine equals the engine torque multiplied by the rotative speed of the engine. Most of that energy is transferred to the fluid in the form of heat because the torque converter output member 40, 140 is rotatively fixed to ground and therefor transfers no energy. Provision is made for cooling the fluid by diverting a fraction of it to a cooler (not shown) as it leaves the turbine 20, 120 and returning cooled fluid to the converter 10, 110 between the stator 22, 122 and the pump 18, 118.

At speeds lower than idle, the piston 60, 160 is maintained in the open position 62, 162 by the springs 82, 182. With the axial gap A1, A2 between the pump 18, 118 and the turbine 20, 120 open, fluid flow from the pump 18, 118 to the turbine 20, 120 deviates from a conventional toroidal flow pattern. A portion of the fluid leaving the exit side 96, 196 of the pump 18, 118 is directed radially outward and passes through the axial gap A1, A2. That portion of fluid travels outside of the turbine shell 36, 136, joining with fluid leaving the turbine 20, 120 for the cooler. Reducing the quantity of fluid impinging on the turbine blades 38, 138 reduces the drag torque on the engine, reducing the required energy output by the engine to maintain a particular idle speed, reducing the amount of energy that the fluid must absorb, and thereby reducing the fluid cooling requirements for a particular idle speed. The greater the quantity of fluid diverted from the turbine 20, 120, the lower the cooling requirements are. The potential for cooling requirements reduction though is limited though by the need to provide adequate vehicle acceleration. If too great a quantity of fluid is diverted from the turbine 20, 120, the level of transmitted torque will be inadequate to properly accelerate the vehicle.

As engine speed increases above idle, fluid enters the centrifugal chamber 80, 180 through the channel 84 from the blade side 86, 186 pump 18, 118. Radial acceleration of fluid within the centrifugal chamber 80, 180 increases the pressure of the fluid against the piston 60, 160. At idle, the pressure begins to overcome the opposing springs 82, 182, axially displacing the piston 60, 160 toward the turbine 20, 120 and the closed position 64, 164, closing the axial gap A1, A2 between the turbine 20, 120 and the pump 18, 180. This effectively prevents the fluid exiting the pump 18, 118 from bypassing the turbine 20, 120. Any fluid or air in the spring chamber 78, 178 is able to escape into the transmission housing interior 14, 114 through the apertures 88, 188, and 90, 190 in the piston sleeve portion 66, 166 and the pump cover 48, 148.

With the piston 60, 160 in the closed position 64, 164, the torque converter 10, 110 behaves largely as would a conventional torque converter. Fluid passes from the pump 18, 118 to the turbine 20, 120 to the stator 22, 122 and back to the pump 18, 118. Some of the fluid flowing from the turbine 20, 120 to the stator 22, 122 is diverted to the cooler. Fluid entering the pump 18, 118 from the stator 22, 122 is joined by fluid returning from the cooler. When the rotative speed drops to or below idle, the piston 60, 160 is restored to the open position 62, 162 by the springs 82, 182. Fluid in the centrifugal chamber 80, 180 escapes through the channel to the pump.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. In combination, a fluid bypass mechanism and a torque converter within which the bypass mechanism is disposed, the torque converter functionally interposed between a motor vehicle engine and a transmission, the torque converter of the type having a converter housing enclosing a pump and a turbine and a stator, the converter rotatively disposed on a common axis of rotation, the pump and the converter housing and the engine rotatively fixed to one another, the pump having a pump shell and pump blades on a blade side of the pump shell, the bypass mechanism comprising:

the pump and turbine configured so as to provide an axial gap between the pump and the turbine through which a portion of the fluid leaving the pump flows radially beyond the turbine when the gap is open;

the converter housing and the pump cooperating so as to provide an annular piston chamber;

an annular piston disposed within the annular piston chamber, coaxial with the pump and the turbine and the converter housing, having a ring portion and a sleeve portion, the sleeve portion projecting axially forward from the ring portion, the ring portion separating the annular piston chamber into a spring chamber and a centrifugal chamber, the piston sleeve portion encircling the pump, the piston being slidably disposed along the axis of rotation for translation between an open position where the sleeve portion does not impinge on the gap when a pump rotative speed is in a range inclusive of speeds approximately equal to and below a predetermined rotative speed, and a closed position where the sleeve portion closes the axial gap as the pump rotative speed is increased beyond the predetermined rotative speed;

a fluid feed channel fluidly connecting the blade side of the pump shell with the centrifugal chamber;

a spring disposed in the spring chamber, tending to maintain the piston in the open position; and vent means for the spring chamber including
means defining as aperture through the piston sleeve portion fluidly connecting the spring chamber with the converter housing,
means defining an aperture through the converter housing fluidly connecting the aperture in the piston sleeve portion with an interior of the transmission housing,
a lip projecting forward from the ring portion at an inside circumference of the ring portion being slidably sealed with the pump shell, and
the sleeve portion being slidably sealed with the converter housing both forward and rearward of the apertures in the converter housing and in the piston sleeve and being slidably sealed with the pump shell forward of both the spring chamber and the aperture in the sleeve.

2. A fluid bypass mechanism and torque converter in combination as described in claim 1, further characterized by the spring and the annular piston being adapted to provide the predetermined rotative speed equal to an engine idle speed.

* * * * *